May 4, 1965 L. M. PUSTER 3,181,432
MEANS FOR ADJUSTING THE EFFECTIVE AREA OF
A PRESSURE RESPONSIVE DIAPHRAGM
Filed Oct. 9, 1961 3 Sheets-Sheet 1
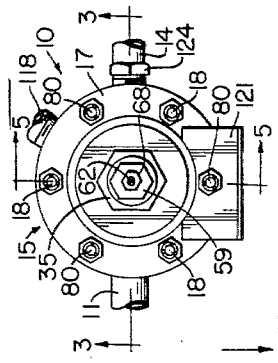
INVENTOR.
LOUIS M. PUSTER
BY
Robert R Cauder
ATTORNEY

INVENTOR.
LOUIS M. PUSTER

BY Robert R. Cauder
ATTORNEY

United States Patent Office 3,181,432
Patented May 4, 1965

3,181,432
MEANS FOR ADJUSTING THE EFFECTIVE AREA OF A PRESSURE RESPONSIVE DIAPHRAGM
Louis Medart Puster, Knoxville, Tenn., assignor to Robertshaw Company, a corporation of Delaware
Filed Oct. 9, 1961, Ser. No. 143,889
6 Claims. (Cl. 92—6)

This invention relates to an improved differential pressure transmitter and to parts therefor or the like.

The differential pressure transmitter of this invention operates on a principle known as force balance, whereby a first or measuring diaphragm moves in relation to the force differential of two input pressures acting respectively on opposite sides of the first diaphragm and is opposed by a second force acting on a second or feedback diaphragm operatively interconnected to the first diaphragm, the second force being controlled by valve means controlled in response to the input pressure differential so that the pressure value of the signal pressure fluid acting on the second diaphragm will be proportional to the input differential and can be readily measured.

In this manner, such a differential pressure transmitter can measure the difference in pressure on opposite sides of an orifice in line, such as in a transmission line or the like. Of course, the differential pressure transmitter can be utilized for other purposes, as desired, such as for the measurement of flow, liquid level, pressure and the like.

Accordingly, it is an object of this invention to provide an improved differential pressure transmitter having one or more of the novel features of this invention as set forth above or hereinafter shown or described.

Another object of this invention is to provide improved parts for such a differential pressure transmitter or the like.

Other objects, uses and advantages of this invention are apparent from a reading of this description, which proceeds with reference to the accompanying drawings forming a part thereof and wherein:

FIGURE 1 is a side view of one of the improved differential pressure transmitters of this invention.

FIGURE 2 is an end view of the differential pressure transmitter of FIGURE 1.

FIGURE 3 is an enlarged, axial, cross-sectional view of the differential pressure transmitter illustrated in FIGURE 2 and is taken on line 3—3 thereof.

FIGURE 3A is a perspective view of one of the parts of the differential pressure transmitter of FIGURE 3.

Figure 4:
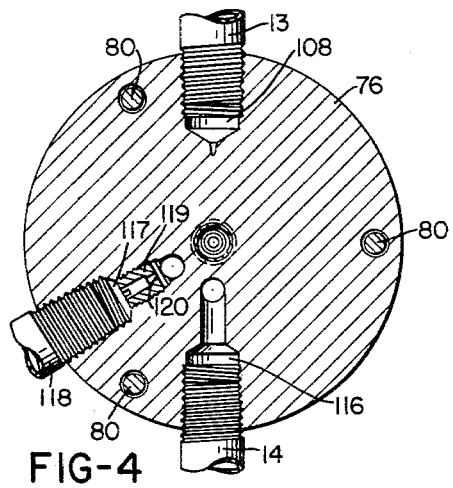
FIGURE 4 is a reduced, cross-sectional view of the differential pressure transmitter illustrated in FIGURE 3 and is taken on line 4—4 thereof.

While the various features of this invention are hereinafter illustrated and described as being combined in a differential pressure transmitter or the like of this invention, it is to be understood that the various features of this invention could be utilized singly or in various combinations thereof in other types of apparatus, as desired.

Therefore, this invention is not to be limited to only the embodiments thereof illustrated in the drawings, because the drawings are merely utilized to illustrate one of the wide variety of uses of this invention.

Referring now to FIGURES 1–3, an improved differential pressure transmitter of this invention is generally indicated by the reference numeral 10 and is adapted to measure the differential in pressure values of pressure fluids supplied respectively to the transmitter 10 by conduits 11 and 12, the conduit 11 conveying the pressure fluid normally having a pressure value higher than the pressure value of the pressure fluid being supplied by the conduit 12.

Instrument pressure fluid is supplied to the transmitter 10 by a conduit 13, whereby the pressure differential between the pressure fluids supplied by the conduits 11 and 12 is proportional to the instrument pressure fluid passing out of the transmitter 10 through a conduit 14 leading to a suitable instrument (not shown) that reads the pressure value of the instrument pressure fluid passing through the conduit 14 in terms of the pressure differential of the pressure fluids in conduits 11 and 12.

Figure 5:
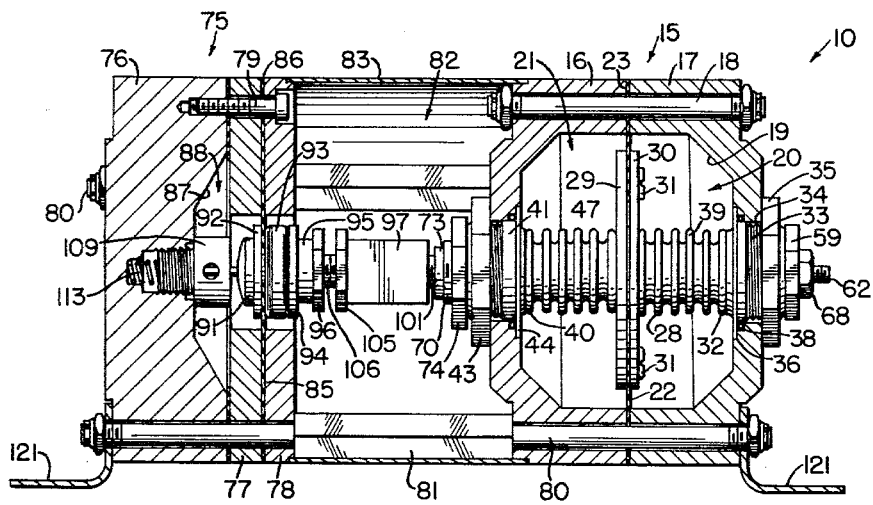
FIGURE 5 is an enlarged, axial, cross-sectional view of the differential pressure transmitter of FIGURE 2 and is taken on line 5—5 thereof.

The differential pressure transmitter 10 comprises a first housing 15 formed from two housing members 16 and 17 suitably secured together by bolts 18, FIGURE 5, and defining an internal cavity 19 separated into two chambers 20 and 21 by a flexible diaphragm 22 having the outer periphery 23 thereof clamped between the mating surfaces of the housing members 16 and 17.

The high pressure conduit 11 is interconnected to a port 24 formed in the housing member 17 and leading to the chamber 20. Similarly, the low pressure conduit 12 is interconnected to a port 25 formed in the housing member 16 and leading to the chamber 21.

An aperture 26 passes centrally through the measuring diaphragm 22 and defines an inner periphery 27 of the measuring diaphragm 22.

A bellows tube 28 passes through the aperture 26 of the measuring diaphragm 22 and is operatively interconnected to the inner periphery 27 of the measuring diaphragm by a diaphragm plate 29 and a ring 30 interconnected together by threaded members 31.

The bellows tube 28 is so constructed and arranged that one end 32 of the bellows tube 28 is secured to a threaded member 33 passing through a bore 34 of the housing member 17 and being secured thereto by a nut 35, the threaded member 33 having an outwardly directed annular flange 36 received in an annular recess 37 of the housing member 17 and sealed against an O-ring 38 or the like.

The end 32 of the bellows tube 28 is corrugated in such a manner that the same forms a bellows construction 39 in the chamber 20 of the housing 15.

Similarly, the other end 40 of the bellows tube 28 is secured to a threaded member 41 passing through a bore 42 of the housing member 16 and secured thereto by a nut 43, the threaded member 41 having an outwardly directed annular flange 44 disposed in an annular recess 45 formed in the housing member 16 and sealed against an O-ring 46 or the like.

The end 40 of the bellows tube 28 is corrugated in such a manner that the same forms a bellows construction 47 disposed in the chamber 21 of the housing 15.

The bellows constructions 39 and 47 are substantially identical and have closely matched areas to eliminate any motion due to static pressure variations in the chambers 20 and 21.

Since the bellows constructions 39 and 47 are formed from the same bellows tube 28, the bellows constructions 39 and 47 have the same specific heat treatment, have the same wall thickness, and are formed of the same material, whereby the bellows constructions 39 and 47 are substantially uniform.

For example, the bellows constructions 39 and 47 can be formed by first inserting the uncorrugated bellows tube 28 in the proper position in a bore 48 passing through the diaphragm plate 29. Thereafter, the ends 32 and 40 of the bellows tube 28 are corrugated to form the bellows constructions 39 and 47 on the opposite sides of the diaphragm plate 29 in the manner illustrated in FIGURE 6, whereby the diaphragm plate 29 is held between the bellows constructions 39 and 47.

Figure 6:
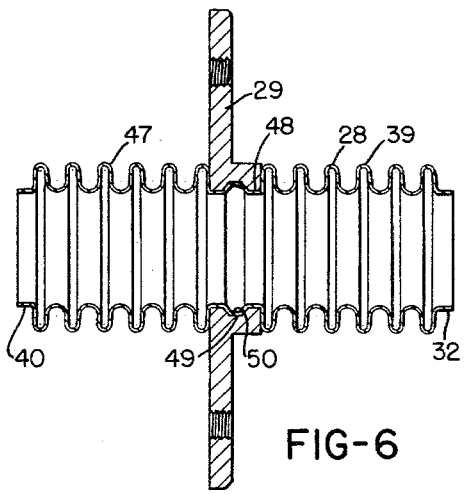
FIGURE 6 is an enlarged, cross-sectional view of the bellows assembly for the differential pressure transmitter of FIGURE 1.

The diaphragm plate 29 has an annular groove 49 formed medially of the ends of the bore 48 thereof, whereby a portion 50 of the bellows tube 28 can be forced into the recess 49 in the manner illustrated in FIGURE 6.

A stem 51 is interconnected to the bellows tube 28 by being disposed in the bellows construction 47 and having the enlarged end 52 thereof provided with a threaded bore 53 which receives a threaded member 54 that clamps a retainer 55 against a split ring 56 disposed inside the bellows tube 28 and depressing the portion 50 of the bellows tube 28 into the recess 49 of the diaphragm 29, as illustrated in FIGURE 3, the threaded member 54 having an enlarged head 57 which clamps against the retainer 55 and holds the stem 51, ring 56 and retainer 55 in stacked relation.

In this manner, the split ring 56 secures the stem 51 to the medial portion 50 of the bellows tube 28 so that movement of the measuring diaphragm 22 causes like axial movement of the stem 51.

A threaded bore 58 passes through the threaded member 33 and threadedly receives a retainer 59 having an outwardly directed annular flange 60 abutting the free end of the retainer 33, the retainer 59 having a threaded bore 61 passing therethrough.

An adjusting screw 62 is threadedly disposed in the bore 61 of the retainer 59 and has a free end engaging a cradle member 64 having one end 65 of a compression spring 66 disposed in engagement therewith, the other end 67 of the compression spring 66 abutting the retainer 55 and encompassing the enlarged head 57 of the threaded member 54.

In this manner, adjustment of the screw 62 varies the force of the compression spring 66, tending to urge the measuring diaphragm 22 to the left for a purpose hereinafter described.

A nut 68 is carried by the adjusting screw 62 and can be utilized to lock the adjusting screw 62 in the desired position thereof.

The other threaded member 41 has a threaded bore 69 passing therethrough and threadedly receives an external threaded portion 70 of a stop sleeve 71 having a pair of opposed ends 72 and 73.

The position of the sleeve 71 relative to the threaded member 41 can be locked by a nut 74 carried on the threaded portion 70 of the sleeve 71.

In this manner, movement of the diaphragm 22 to the left as viewed in the drawings is limited by the end 72 of the stop sleeve 71, because the enlarged head 52 of the stem 51 will abut the end 72 of the stationary sleeve 71. Thus, overstressing of the measuring diaphragm 22 and bellows constructions 39 and 47 is prevented by the stop sleeve 71 when the diaphragm 22 is moved to the left.

The end 73 of the stop sleeve 71 prevents overmovement of the diaphragm 22 and bellows 39 and 47 to the right in a manner hereinafter described.

A second housing 75 of the transmitter 10 comprises a housing member 76 and a pair of range rings 77 and 78 secured together by a plurality of threaded members 79, FIGURE 5, the housing 75 being interconnected to the housing 15 by a plurality of bolts 80, FIGURE 5. Central hexagonal sections 81 of the bolts 80 space the housings 15 and 75 relative to each other to define a compartment 82 therebetween, the compartment 82 being closed by a cover 83 formed from a strip of spring temper steel or the like and provided with a captive tension spring 84, FIGURE 1, to enclose the compartment 82 and discourage unauthorized tampering with the adjustments in the compartment 82.

A feedback diaphragm 85 has the outer periphery 86 thereof clamped between the range rings 77 and 78 and cooperates with a cavity 87 in the housing member 76 to define a chamber 88 in the housing 75.

The feedback diaphragm 85 has a central aperture 89 passing therethrough and receiving a threaded member 90 having an enlarged head 91 that clamps a disc 92 against one side of the diaphragm 85.

A resilient disc 93 is telescoped on the threaded member 90 and abuts the other side of the feedback diaphragm 85, a disc 94 abutting the other side of the flexible disc 93 and being held thereagainst by a spacer 95 and a nut 96 carried by the threaded member 90.

In this manner, the flexible disc 93 can be utilized to change the effective area of the feedback diaphragm 85 for a purpose hereinafter described.

Figure 7:
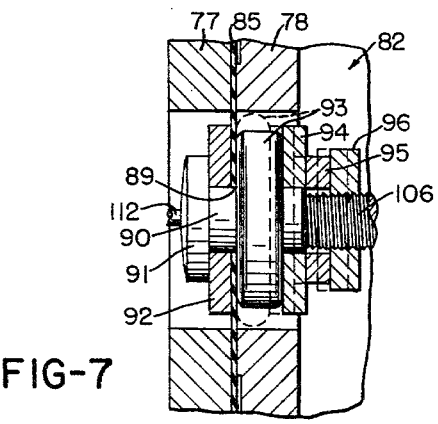
FIGURE 7 is a fragmentary, cross-sectional view of the feedback diaphragm of the pressure transmitter of FIGURE 3 and illustrates the method of this invention for changing the effective area of the feedback diaphragm.

In particular, as illustrated in FIGURE 7, the resilient disc 93 can be further compressed against the diaphragm 85 by turning the nut 96 in one direction, whereby the effective surface of the flexible disc 93 engaging the feedback diaphragm 85 can be increased as illustrated in dotted lines.

Since the effective area of a diaphragm clamped between range rings and discs is proportional to the average of the outer diameters of the discs and the inner diameter of the rings, the effective area of the feedback diaphragm 85 increases as the compression force against the flexible disc 93 is increased. Conversely, the effective area of the feedback diaphragm 85 is decreased as the compression force on the flexible disc 93 is decreased.

The threaded member 90 and stem 51 are interconnected together by a connector 97, whereby the measuring diaphragm 22 and feedback diaphragm 85 are operatively interconnected together.

In particular, the connector 97 comprises a substantially rectangular member having a first slot 98 passing partially therethrough to divide the connector into two halves and having another slot 99, FIGURE 3A, passing partially therethrough and disposed at right angles relative to the slot 98.

A threaded bore 100 passes through the right half of the connector 97 and threadedly receives the threaded end 101 of the stem 51, the connector 97 being firmly secured to the stem 91 upon tightening of a threaded member 102 that tends to close the right-hand portion of the slot 99 in a manner well known in the art.

The left half of the connector 97 has a smooth bore 103 passing therethrough to receive an end 104 of a retainer 105 threaded on the threaded end 106 of the threaded member 90, the retainer 105 being secured to the connector 97 upon tightening of a threaded member 107 that tends to close the left half of the slot 99 in a manner well known in the art.

Therefore, it can be seen that the measuring diaphragm 22 and feedback diaphragm 85 can be operatively interconnected together so that any movement of the measuring diaphragm 22 in response to the differential in pressure values of the pressure fluids in the chambers 20 and 21 will cause a like movement of the feedback diaphragm 85.

As previously set forth, the stop sleeve 71 utilizes the end 73 thereof to limit movement of the measuring diaphragm 22 to the right because excess movement of the measuring diaphragm 22 to the right causes the connector 97 to abut the end 73 of the stationary sleeve 71 and prevent further movement of the diaphragm 22 to the right.

The measuring pressure fluid conduit 13 is interconnected to a port or passage means 108 formed in the, housing member 76 of the housing 75, the passage means 108 leading to the chamber 88.

A valve seat member 109 is disposed in the passage means 108 and has a valve seat 110 which is adapted to be closed by a poppet type valve member 111 having a stem 112 continuously disposed in abutting engagement with the enlarged end 91 of the threaded member 90 by a compression spring 113, the compression spring 113 having one end 114 thereof disposed against the housing member 76 and the other end 115 thereof disposed against the valve member 111.

In this manner, the position of the feedback diaphragm 85 controls the position of the valve member 111 relative to the valve seat 110 to vary the degree of communication between the passage means 108 and the chamber 88 for a purpose hereinafter described.

The conduit 14 leading to the measuring instrument is interconnected to a port or passage means 116 formed in the housing member 76 and leading to the chamber 88.

As illustrated in FIGURE 4, a passage means or port 117 is formed in the housing member 76 and interconnects the chamber 88 to a conduit 118 leading to a sump or the atmosphere, the passage means 117 having a restriction member 119 disposed therein and provided with a fixed orifice utilized for a purpose hereinafter described.

Certain of the bolts 80 of the differential transmitter 10 are utilized to carry mounting brackets 121, FIGURES 1 and 5, so that the transmitter 10 can be suitably mounted to the desired structure.

A pair of ports 122 and 123 are respectively formed in the housing members 16 and 17 and are interconnected to the chambers 20 and 21, the ports 122 and 123 being respectively closed by threaded plugs 124 and 125.

The plugs 124 and 125 are utilized to subsequently clean the chambers 20 and 21 of the housing 15 should any sediment or the like collect therein. For example, the transmitter 10 can be mounted by the brackets 121 in such a manner that the lowest point of the transmitter 10 will be disposed adjacent the plugs 124 and 125 so that the aforementioned cleaning operation can be accomplished.

The operation of the differential transmitter 10 will now be described.

Assuming that by way of example a constant supply of 20 p.s.i. instrument-measuring air or fluid is being conveyed by the conduit 13 to the transmitter 10 and that the pressure values of the pressure fluids conveyed to the compartments 20 and 21 of the transmitter 10 are equal, the operator adjusts the adjusting screw 62 to cause the measuring diaphragm 22 to be moved slightly to the left and cause the threaded member 90 of the feedback diaphragm 85 to slightly open the poppet valve 111 so that the chamber 88 will contain pressure fluid of approximately 3 p.s.i. as maintained by the fixed orifice 120 and slightly opened poppet valve 111.

In this manner, the instrument interconnected to the conduit 14 is so calibrated that when the same reads a 3 p.s.i. pressure value in the chamber 88 of the transmitter 10, the instrument reading is zero and indicates that the pressure values of the pressure fluids conveyed to the chambers 20 and 21 are equal.

Thereafter, should the pressure value of the pressure fluid in the chamber 20 increase over the pressure value of the pressure fluid in the chamber 21, the measuring diaphragm 22 will move to the left and through the stem 51 and threaded member 90 and cause the feedback diaphragm 85 to move to the left and further open the poppet valve 111, whereby the pressure value of the pressure fluid supplied to the chamber 88 increases. When the pressure value of the pressure fluid in the chamber 88 increases to a value so that the force of the pressure fluid in the chamber 88 that acts on the feedback diaphragm 85 is equal to the force tending to move the measuring diaphragm 22 to the left, a force balance of the transmitter 10 is effected whereby the pressure value of the pressure fluid in the chamber 88 has increased proportional to the increase in differences in pressure values of the pressure fluids in the chambers 20 and 21.

Thus, the instrument connected to the conduit 14 of the transmiter 10 will read the change in pressure value of the pressure fluid in chamber 88 in terms of pressure differential between the pressure fluids in the chambers 20 and 21.

Therefore, the pressure differential on opposite sides of the measuring diaphragm 22 may vary between zero to 300 inches of water pressure, while the pressure value of the pressure fluid in the chamber 88 varies proportionally between 3 p.s.i. to 15 p.s.i. or the like.

However, it may be desired to provide differential pressure transmitters 10 having ranges between 50 and 300 inches of water for static heads for up to 150 p.s.i. Therefore, it becomes important to match very accurately the mean effective areas of the feedback diaphragm 85 and the measuring diaphragm 22 so that the exact range specified is met. To accomplish this, the effective area of the resilient disc 93 abutting the diaphragm 85 can be varied by turning the nut 96 in the manner previously described. Therefore, the feedback diaphragm 85 can be very accurately calibrated to match the measuring diaphragm 22 and eliminate the effect of manufacturing tolerances and parts. For example, it has been found that by utilizing the resilient disc 93, an effective area change on the feedback diaphragm 85 of plus or minus 10 percent can easily be accomplished.

Therefore, it can be seen that an improved differential pressure transmitter has been provided by this invention as well as improved parts therefor or the like.

Figure 8:
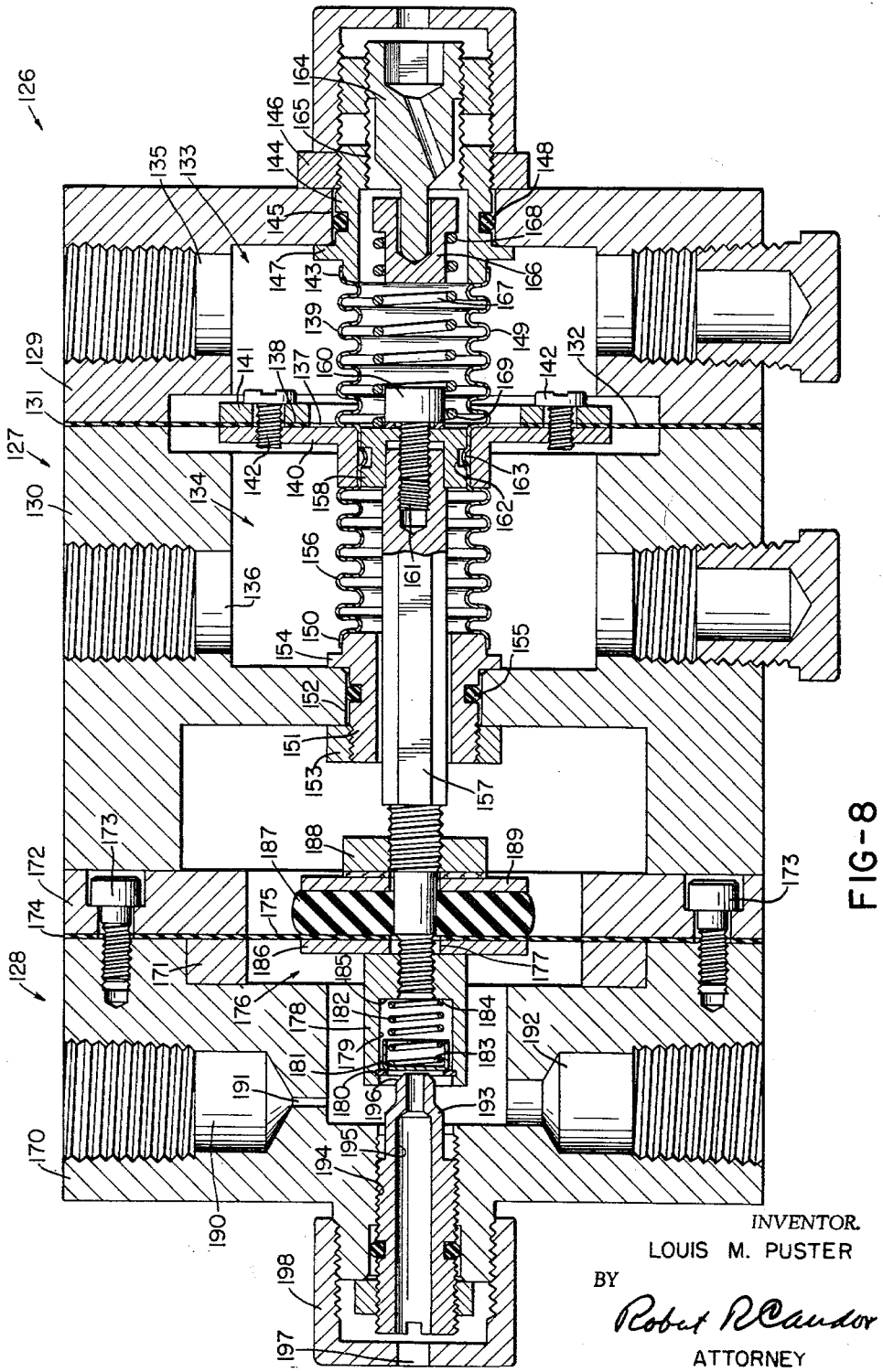
FIGURE 8 is a view similar to FIGURE 3 and illustrates another differential pressure transmitter of this invention.

Another differential pressure transmitter of this invention is illustrated in FIGURE 8 and is generally indicated by reference numeral 126, the transmitter 126 including a first housing 127 interconnected to a second housing 128 by a plurality of bolts (not shown).

The first housing 127 comprises a pair of housing members 129 and 130 suitably interconnected together and sandwiching the outer periphery 131 of a measuring diaphragm 132 therebetween, the measuring diaphragm 132 cooperating with the housing members 129 and 130 to divide the same into two compartments 133 and 134.

The compartment 133 is interconnected to a high pressure port 135 and the compartment 134 is interconnected to a low pressure port 136.

An aperture 137 passes centrally through the measuring diaphragm 132 and defines an inner periphery 138 thereof.

A bellows tube 139 passes through the aperture 137 of the measuring diaphragm 132 and is interconnected to a diaphragm plate 140 which cooperates with a ring 141 to sandwich the inner periphery 138 of the diaphragm 132 therebetween, the diaphragm plate 140 and ring 141 being interconnected together by a plurality of threaded members 142.

One end 143 of the bellows tube 139 is interconnected to a threaded member 144 which passes through an aperture 145 in the housing member 129 and is interconnected thereto by a nut 146, the threaded member 144 having an outwardly directed annular flange 147 abutting the housing member 129. The threaded member 144 is sealed in the bore 145 by an O-ring 148 or the like.

The end 143 of the bellows tube 139 is suitably corrugated to define a bellows construction 149 in the chamber 133.

Similarly, the other end 150 of the bellows tube 139 is interconnected to a threaded member 151 passing through a bore 152 in the housing member 130 and being secured thereto by a nut 153, the threaded member 151 having an outwardly directed annular flange 154 abutting the housing member 130. The threaded member 151 is sealed in the bore 152 by an O-ring 155 or the like.

The end 150 of the bellows tube 139 is suitably corrugated to define a bellows construction 156 disposed in the chamber 134 of the transmitter 126.

A stem 157 passes through the bellows construction 156 and threaded member 151, the stem 157 being interconnected by a threaded member 160 to a retainer 158 secured to the bellows tube 139, the threaded member 160 being received in a threaded bore 161 formed in the end of the stem 157.

The retainer 158 has an annular recess 162 which receives a turned-in portion 163 of the bellows tube 139 whereby the stem 157 is fixed to the bellows tube 139 and moves in unison with the measuring diaphragm 132.

An adjusting member 164 is threadedly disposed in a threaded bore 165 formed in the threaded member 144, the adjusting member 164 engaging a cradle member 166.

A compression spring 167 has one end 168 thereof engaging the cradle member 166 and the other end 169 thereof abutting the retainer 158 and encompassing the threaded member 160, whereby the compression spring 167 can be utilized to vary the position of the measuring diaphragm 132 in a manner similar to the adjusting screw 62 previously described.

The second housing 128 comprises a housing member 170 and a pair of range rings 171 and 172 suitably interconnected together by threaded members 173, the outer periphery 174 of a feedback diaphragm 175 being sandwiched between the range rings 171 and 172 as well as the housing member 170 in the manner illustrated.

The feedback diaphragm 175 cooperates with the housing 128 to define a chamber 176 therewith.

The stem 157 projects through a central aperture 177 formed in the feedback diaphragm 175 and carries a cup-shaped member 178 on the outer free end thereof, the cup-shaped member 178 being disposed in the chamber 176 and having a bore 179 formed therein.

A retaining ring 180 is disposed in the bore 179 of the cup-shaped member 178 to limit outward movement of a flapper type valve member 181 disposed in the bore 179 and normally urged against the retaining ring 180 by a compression spring 182 having one end 183 thereof disposed against the valve member 181 and the other end 184 thereof disposed against an inner wall 185 of the cup-shaped member 178.

The cup-shaped member 178 clamps a disc 186 against one side of the feedback diaphragm 175.

A resilient disc 187 is telescopically disposed on the stem 157 and abuts the other side of the feedback diaphragm 175, the compression of the resilient disc 187 being controlled by a nut 188 disposed on the stem 157 and holding a disc 189 against the other side of the resilient disc 187.

In this manner, the effective area of the feedback diaphragm 175 can be controlled by varying the compression of the disc 187 thereagainst in the same manner as the resilient disc 93 previously described.

A port 190 is formed in the housing member 170 and leads to the chamber 176, the port 190 having a fixed orifice 191 formed therein and being suitably interconnected to a source of measuring fluid pressure in a manner similar to port 108 of the transmitter 10 previously described.

The chamber 176 of the housing 128 is interconnected to a suitable measuring instrument by a port 192.

A valve seat member 193 is threadedly disposed in a threaded bore 194 formed in the housing member 170, the valve seat member 193 having a bore 195 passing through the valve seat 196 and interconnected to the atmosphere by an opening 197 formed in a cover member 198.

The operation of the transmitter 126 will now be described.

Assuming that a constant supply of measuring pressure fluid is being supplied to the port 190 of the transmitter 126 and that the pressure values of the pressure fluids in the chambers 133 and 134 are equal, the operator adjusts the adjusting member 164 in such a manner that the valve 181 causes the chamber 176 to contain pressure fluid having a pressure value of approximately 3 p.s.i., whereby the reading of the instrument interconnected to the port 192 is zero.

Thereafter, as the pressure value of the pressure fluid in the chamber 133 increases over the pressure value of the pressure fluid in the chamber 134, the measuring diaphragm 132 moves to the left, whereby the stem 157 moves to the left, carrying the feedback diaphragm 175 therewith, to tend to move the valve member 181 against the valve seat 196. However, as the valve member 181 moves toward the valve seat 196, the pressure valve of the pressure fluid in the chamber 176 increases until the force thereof acting against the feedback diaphragm 175 is substantially equal to the force differential tending to move the measuring diaphragm 132 to the left. The increase in the pressure value of the pressure fluid in the chamber 176 is proportional to the pressure differential between the chambers 133 and 134 and is measured by the instrument interconnected to the port 192, whereby an accurate reading can be obtained of the pressure differential between the chambers 133 and 134 in substantially the same manner as previously described for the differential pressure transmitter 10.

Therefore, it can be seen that improved differential pressure transmitters are provided by this invention which not only can accurately measure the differential in pressure values but which also are adapted to have the ranges thereof adjusted by varying the effective areas of the feedback diaphragms thereof in a simple manner. Further, because the bellows assemblies of the differential pressure transmitters of this invention are formed from single bellows tubes, no accurate matching of bellows is required to form accurate instruments.

While the form of the invention now preferred has been disclosed as required by the statutes, other forms may be used, all coming within the scope of the claims which follow.

What is claimed is:

1. In combination, a housing having a cavity, a diaphragm having the outer periphery thereof secured to said housing and cooperating with said cavity to define a chamber, a flexible disc having a surface abutting one side of said diaphragm, and means operatively interconnected to said disc to vary the effective surface thereof abutting said one side of said diaphragm to vary the effective area of said diaphragm.

2. In combination, a housing having a cavity, a diaphragm having the outer periphery thereof secured to said housing and cooperating with said cavity to define a chamber, and means operatively interconnected to said diaphragm to vary the effective area of said diaphragm, said means having a surface means contacting said diaphragm and having means to vary the effective total surface area of said surface means contacting said diaphragm to vary the effective area of said diaphragm.

3. In combination, a housing having a cavity, a diaphragm having the outer periphery thereof secured to said housing and cooperating with said cavity to define a chamber, a flexible disc having a surface abutting one side of said diaphragm, a bolt passing through said diaphragm and said flexible disc and having an enlarged head disposed on the other side of said diaphragm, said bolt having a nut disposed on said one side of said diaphragm, said nut causing said flexible disc to expand outwardly when said nut is turned in one direction to increase the effective area of said diaphragm and said nut causing said flexible disc to contract when said nut is turned in the other direction to decrease the effective area of said diaphragm.

4. In combination, a housing having a cavity, a diaphragm having the outer periphery thereof secured to said housing and cooperating with said cavity to define a chamber, and a flexible means contacting said diaphragm to vary the effective area of said diaphragm in relation to the effective total surface area of said flexible means contacting said diaphragm.

5. A combination as set forth in claim 4 wherein means are operatively interconnected to said flexible means to vary the area of surface thereof that contacts said diaphragm to vary the effective area of said diaphragm.

6. A combination as set forth in claim 5 wherein said last-named means variably compresses said flexible means against said diaphragm.

References Cited by the Examiner

UNITED STATES PATENTS

| | | | |
|---|---|---|---|
| 398,525 | 2/89 | McCloskey | 137—783 |
| 1,937,314 | 11/33 | Bryant | 137—788 |
| 2,146,176 | 2/39 | Donaldson | 137—783 XR |
| 2,162,779 | 6/39 | Leutwiler et al. | 137—495 |
| 2,197,454 | 4/40 | Smith | 137—783 |
| 2,584,455 | 2/52 | Hughes | 137—85 |
| 2,811,172 | 10/57 | Frazel | 92—6 |
| 2,950,739 | 8/60 | Lofink | 137—788 |
| 2,953,166 | 9/60 | Carlson | 137—788 |

MARTIN P. SCHWADRON, *Primary Examiner.*